(12) United States Patent
Petrovic et al.

(10) Patent No.: US 8,412,211 B2
(45) Date of Patent: Apr. 2, 2013

(54) TRANSMISSION AND RECEPTION OF BROADCAST SYSTEM INFORMATION IN A MOBILE COMMUNICATION SYSTEM

(75) Inventors: Dragan Petrovic, Langen (DE);
Takahisa Aoyama, Osaka (JP);
Hidetoshi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 774 days.

(21) Appl. No.: 12/094,267

(22) PCT Filed: Oct. 20, 2006

(86) PCT No.: PCT/EP2006/010153
§ 371 (c)(1),
(2), (4) Date: Nov. 18, 2008

(87) PCT Pub. No.: WO2007/068304
PCT Pub. Date: Jun. 21, 2007

(65) Prior Publication Data
US 2009/0221293 A1    Sep. 3, 2009

(30) Foreign Application Priority Data
Dec. 13, 2005  (EP) .................................. 05027214

(51) Int. Cl.
*H04W 72/00*  (2009.01)
(52) U.S. Cl. ..................... 455/450; 455/452.2; 455/509; 455/3.01; 370/312; 370/338
(58) Field of Classification Search .................. 455/455, 455/464, 450–452.2, 509, 3.01; 709/217, 709/238; 370/347, 350, 432, 437, 312, 377, 370/338
See application file for complete search history.

(56) References Cited

U.S. PATENT DOCUMENTS

| 6,628,946 | B1 * | 9/2003 | Wiberg et al. ................ 455/434 |
| 7,167,487 | B2 * | 1/2007 | Herrmann ..................... 370/477 |
| 7,298,713 | B2 * | 11/2007 | Goldberg et al. ............ 370/312 |
| 7,515,571 | B2 * | 4/2009 | Kwon et al. .................. 370/338 |
| 7,860,039 | B2 * | 12/2010 | Lee et al. ...................... 370/312 |
| 8,036,188 | B2 * | 10/2011 | Kwon et al. .................. 370/338 |
| 8,041,353 | B2 * | 10/2011 | Kazmi et al. ................. 455/434 |

(Continued)

FOREIGN PATENT DOCUMENTS

| WO | 00/52943 | 9/2000 |
| WO | 03/096717 | 11/2003 |
| WO | 2007/052916 | 5/2007 |
| WO | 2007/052917 | 5/2007 |

OTHER PUBLICATIONS

International Search Report dated Dec. 15, 2006.
3GPP TS 25.331 Version 6.8.0, "Radio Resource Control (RRC); Protocol Specification," Dec. 2005, pp. 1-1174.

(Continued)

*Primary Examiner* — Sharad Rampuria
(74) *Attorney, Agent, or Firm* — Dickinson Wright PLLC

(57) ABSTRACT

The present invention relates to a method and transmission apparatus for transmitting broadcast system information in a mobile communication system. Further, the invention relates to a method and mobile terminal receiving the broadcast system information. To provide an improved method for broadcasting broadcast system information the invention suggests mapping different partitions of broadcast system information to a shared transport channel or a broadcast transport channel for transmission. The mapping may take into account parameters inherent to the mobile terminals to which the broadcast system information is to be transmitted and/or parameters inherent to the different partitions of broadcast system information.

29 Claims, 10 Drawing Sheets

U.S. PATENT DOCUMENTS

| | | | | |
|---|---|---|---|---|
| 8,068,843 | B2* | 11/2011 | Yi et al. | 455/450 |
| 2003/0088695 | A1 | 5/2003 | Kwak et al. | |
| 2005/0041681 | A1 | 2/2005 | Lee | |
| 2005/0164683 | A1* | 7/2005 | Roberts et al. | 455/412.2 |
| 2008/0285668 | A1* | 11/2008 | Lee et al. | 375/260 |
| 2009/0098892 | A1* | 4/2009 | Trogolo et al. | 455/466 |
| 2009/0274086 | A1* | 11/2009 | Petrovic et al. | 370/312 |
| 2010/0022250 | A1* | 1/2010 | Petrovic et al. | 455/450 |
| 2010/0165901 | A1* | 7/2010 | Kim | 370/312 |
| 2010/0260154 | A1* | 10/2010 | Frank et al. | 370/336 |
| 2010/0265899 | A1* | 10/2010 | Du | 370/329 |
| 2010/0302978 | A1* | 12/2010 | Roh et al. | 370/310 |
| 2011/0007673 | A1* | 1/2011 | Ahn et al. | 370/280 |
| 2011/0019615 | A1* | 1/2011 | Krco et al. | 370/328 |

OTHER PUBLICATIONS

3GPP TR 25.813 Version 0.3.0, "Evolved Universal Terrestrial Radio Access (E-UTRA) and Evolved Universal Terrestrial Radio Access Network (E-UTRAN); Radio interface protocol aspects," Jan. 2006, pp. 1-25.

3GPP TS 36.211 Version 8.4.0, "Evolved Universal Terrestrial Radio Access (E-UTRA); Physical Channels and Modulation," Sep. 2008, pp. 1-78.

3GPP TS 36.212 Version 8.4.0, "Evolved Universal Terrestrial Radio Access (E-UTRA); Multiplexing and channel coding," Sep. 2008, pp. 1-56.

3GPP TS 36.213 Version 8.4.0, "Evolved Universal Terrestrial Radio Access (E-UTRA); Physical layer procedures," Sep. 2008, pp. 1-60.

3GPP TS 36.321 Version 8.3.0, "Evolved Universal Terrestrial Radio Access (E-UTRA) Medium Access Control (MAC) protocol specification," Sep. 2008, pp. 1-36.

3GPP TS 36.331 Version 8.3.0, "Evolved Universal Terrestrial Radio Access (E-UTRA) Radio Resource Control (RRC); Protocol specification," Sep. 2008, pp. 1-178.

3GPP TR 25.814 Version 7.1.0, "Physical layer aspects for evolved Universal Terrestrial Radio Access (UTRA)," Sep. 2006, pp. 1-132.

3GPP TSG RAN WG2 #57, R2-070521, Panasonic, "System Information Discussion," Feb. 2007, pp. 1-6.

D. Petrovic et al. "Flexible Scheduling of System Information for Evolved UMTS Radio Access," May 2006, pp. 371-375.

Nishio et al. "Adaptive Transmission Techniques for Control Signaling in 3G-LTE," Panasonic Technical Journal, vol. 55, No. 1, Apr. 2009, pp. 15-20, with English abstract.

Japanese Office Action dated Dec. 27, 2011 with translation.

3G TS 35.331 V3.2.0, "3rd Generation Partnership Project; Technical Specification Group Radio Access Network; RRC Protocol Specification (Release 1999)," Mar. 2000, pp. 26-30.

\* cited by examiner

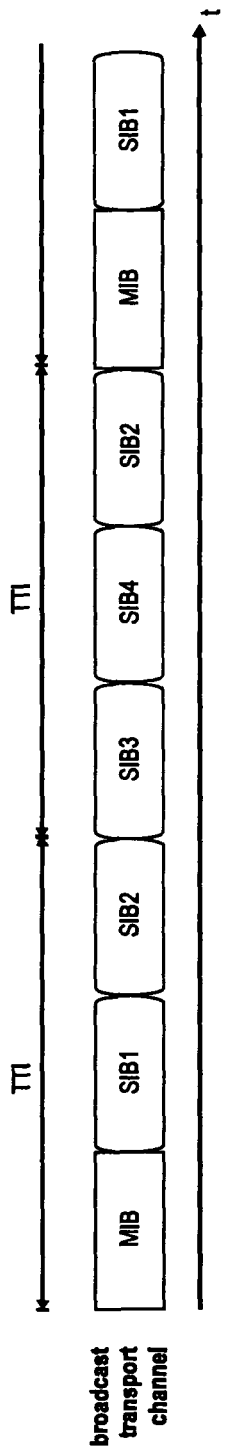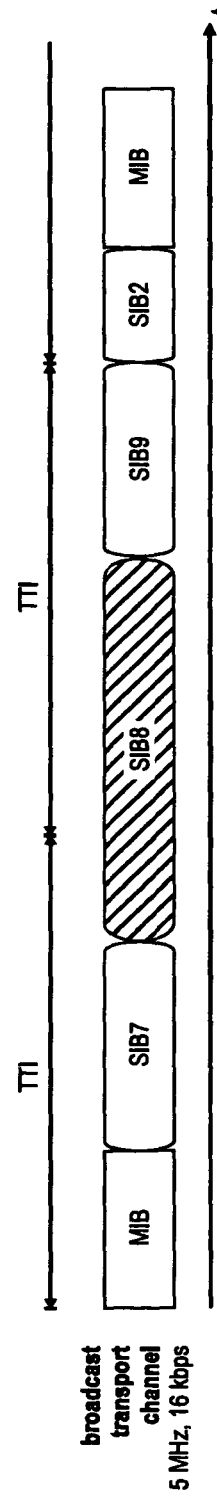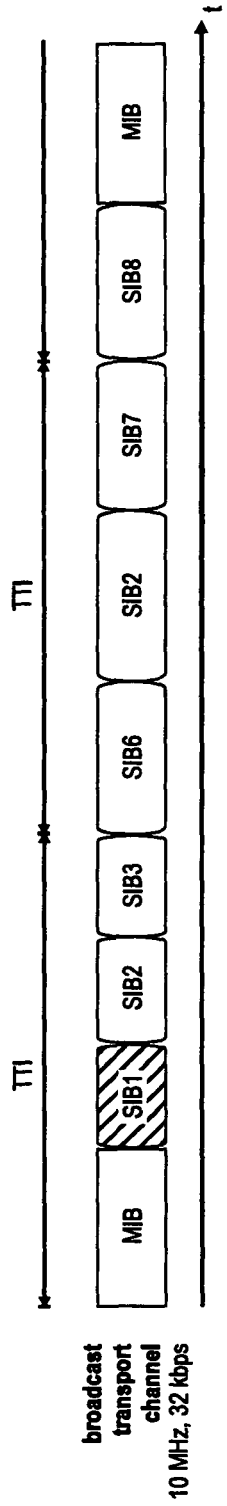

TRANSMISSION AND RECEPTION OF BROADCAST SYSTEM INFORMATION IN A MOBILE COMMUNICATION SYSTEM

FIELD OF THE INVENTION

The present invention relates to a method and transmission apparatus for transmitting broadcast system information in a mobile communication system. Further, the invention relates to a method and mobile terminal receiving the broadcast system information.

TECHNICAL BACKGROUND

W-CDMA (Wideband Code Division Multiple Access) is a radio interface for IMT-2000 system (International Mobile Telecommunication system), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4, Release 5 and Release 6. A discussion on further improvements is ongoing under the scope of Release 7 and Study Item on Evolved UTRA and UTRAN.

UMTS Architecture

The high level Release 99/4/5 architecture of Universal Mobile Telecommunication System (UMTS) is shown in FIG. 1 (see 3GPP TR 25.401: "UTRAN Overall Description", incorporated herein by reference, available from http://www.3gpp.org). The UMTS system consists of a number of network elements each having a defined function. Though the network elements are defined by their respective function, a similar physical implementation of the network elements is common but not mandatory.

The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

In the sequel two different architectures will be discussed. They are defined with respect to logical distribution of functions across network elements. In actual network deployment, each architecture may have different physical realizations meaning that two or more network elements may be combined into a single physical node.

FIG. 2 illustrates the current architecture of UTRAN. A number of Radio Network Controllers (RNCs) 201, 202 are connected to the CN 101. Functionally, the RNC 201, 202 owns and controls the radio resources in its domain and typically terminates the Radio Resource Control protocol on the access network side. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used. Commonly, a Drift RNS 302 is used for soft handovers of UEs between different RNS.

General Description of the Protocol Model of the UTRAN Terrestrial Interfaces

FIG. 4 shows an overview of the protocol model of the UTRAN in an UMTS network. For a better understanding, only a brief description is provided herein; further details may be found in Holma et al., "WCDMA for UMTS", Third Edition, Wiley & Sons, Inc., October 2004, Chapter 5, incorporated herein by reference.

On the horizontal plane, the protocol model can be split into the radio network layer and the transport network layer. All UTRAN-related issues are visible and handled on the radio network layer, while transport network layer typically represents standard transport technology that is selected to be used for data transport for the UTRAN without any UTRAN-specific changes.

On the vertical plane, the protocol model can be split into control plane and user plane. The control plane is used for UMTS-specific control signaling (i.e. signaling related to radio and transport interfaces) and includes the Application Protocol (AP), e.g. RANAP on the Iu interfaces, RNSAP on the Iur interfaces, NBAP on the Iub and RRC on Uu interfaces. The control plane functions and Application Protocol allows setting up traffic radio bearers to the UEs via so-called signaling radio bearers.

While the control plane protocols are responsible for the UMTS-specific control signaling, the user plane transports the data streams sent by and sent to the users, such as voice calls, streaming data, packets of packet-switched services, etc. For transport, the user plane contains the so-called traffic radio bearers (also sometimes referred to as Data Bearers).

The transport network control plane is used for control signaling within the transport network layer and does not include any radio network layer related information. The transport network control plane includes the ALCAP protocol, which is used to set up the traffic bearers for exchanging user plane information and the signaling bearers required for communicating ALCAP protocol messages. Due to the presence of the transport network control plane, it is possible that the Application Protocol within the control plane may operate completely independent from the technology selected for data transport on the traffic radio bearers in the user plane. The transport network control plane controls the operation of the transport network user plane.

UTRA Radio Interface Protocol architecture

An overview of the radio interface protocol architecture of the UTRAN is shown in FIG. 5. Generally, the radio interface protocol architecture of the UTRAN implements Layers 1 to 3 of the OSI protocol stack. The protocols terminated in the UTRAN are also referred to as the access stratum (protocols). In contrast to the access stratum, all protocols not terminated in the UTRAN are typically also referred to as the non-access stratum protocols.

As has been discussed with respect to FIG. 4, the vertical split of the protocols into user plane and control plane is illustrated. The Radio Resource Control (RRC) protocol is a Layer 3 protocol of the control plane which controls the protocols in the lower layers of the UTRA Radio Interface (Uu).

The RRC protocol is typically terminated in the RNC of the UTRAN, however other network elements have also been considered for terminating the RRC protocol in the UTRAN, e.g. the Node Bs. The RRC protocol is used for signaling of control information to control access to radio resources of the radio interface to the UEs. Further, there is also the possibility that the RRC protocol encapsulates and transports non-access stratum messages, which are usually related to control within the non-access stratum.

In the control plane, the RRC protocol relays the control information to Layer 2, i.e. the Radio Link Control (RLC) protocol, via signaling radio bearers through Service Access Points (SAPs). In the user plane the non-access stratum protocol entities may use traffic radio bearers to directly access Layer 2 via SAPs. The access may be made to the RLC directly or to the Packed Data Convergence Protocol which in turn provides its PDUs to the RLC protocol entity.

The RLC offers the SAPs to the higher layers. The RRC configuration defines how RLC will handle the packets, e.g. whether RLC is operating in transparent, acknowledged or unacknowledged mode. The service provided to the higher layers in the control plane and user plane by the RRC or PDCP are also referred to as signaling radio bearer and traffic radio bearer, respectively.

The MAC/RLC layer in turn offers its services to the RLC layer by means of so-called logical channels. The logical channels essentially define what kind of data is transported. The physical layer offers its services to the MAC/RLC layer, the so-called transport channels. The transport channels define how and with which characteristics the data received from the MAC layer are transmitted via the physical channels.

Logical and Transport Channels in UTRAN

In this section the mapping between logical channels and transport channels will be outlined referring for exemplary purposes to the UMTS architecture. The mapping of logical channels to transport channels may be utilized for some of the signaling messages within a RRC connection establishment procedure.

The characteristics and mapping of logical and transport channels for UTRA and E-UTRA are summarized in the following tables. Logical channels are mainly described by data type to be transmitted whereas transport channels are mainly described by respective transmission types and identification method.

The table below contains a description of logical and transport channels for UTRA and E-UTRA, respectively.

TABLE 1

| Logical (LCH) or Transport Channel (TrCH) type vs. channel characteristic and mapping | | Channel characteristic | | | |
|---|---|---|---|---|---|
| | | Data Type | Transmission Type | Direction: Uplink (UL) or Downlink (DL) | Identification method | Mapping (LCH -> TrCH) |
| LCH | BCCH (Broadcast Control CHannel) | system information (broadcast) | N/A | DL | N/A | BCCH -> BCH |
| | CCCH (Common Control CHannel) | common service control (unicast) | N/A | UL or DL | N/A, Note: this logical channel is mainly used for transmission of control plane information prior to identifier assignment to UE by radio access network | CCCH -> FACH, RACH |
| | DCCH (Dedicated Control CHannel) | dedicated service control (unicast) | N/A | UL or DL | N/A | DCCH -> FACH, RACH, DCH |
| TrCH | BCH (Broadcast CHannel) | N/A | Common channel with static configuration | DL | N/A due to broadcast data type | N/A |
| | FACH (Forward Access CHannel) | N/A | Common channel with semi-static configuration | DL | Layer 2 inband when carrying DCCH, N/A otherwise | N/A |
| | RACH (Random Access CHannel) | N/A | Common channel with semi-static configuration and contention-based access | UL | Layer 2 inband when carrying DCCH, N/A otherwise | N/A |
| | DCH (Dedicated CHannel) | N/A | Dedicated channel with semi-static configuration | UL or DL | N/A since this is dedicated transport channel | N/A |

Please note that mapping of DCCH in the table above may be possible on a Fractional Dedicated Channel in downlink direction for UMTS Release 6 and on Enhanced Dedicated Transport Channel in uplink for UMTS Release 6 of the Evolved UTRA. These options have however not been considered in the table for the sake of simplicity.

For UTRA, identification of transport channels as shown in the table above is Layer 2 inband. Layer 2 inband identification means that header of a Layer 2 MAC PDU contains UE identifier pointing at a specific UE as a destination or source of information for downlink or uplink direction, respectively. Consequently, for mapping of logical channels containing data of system information and common service control type identification is not needed. Identification is applicable only to common transport channels (RACH and FACH) apart from broadcast common transport channel (BCH).

The following table shows an exemplary description of logical channels and transport channels in the Evolved UTRA (E-UTRA).

for both SDCH and SUCH. An example of associated physical channel could be Shared Control Signaling CHannel (SC-SCH).

The transmission types description in the respective column of the table above should be understood as follows. A static configuration means that the transport format attributes of the channel, e.g. modulation, forward error correction scheme etc. are system-specific and are not subject to change by the network. In a semi-static configuration the transport format attributes of the channel, e.g. modulation, forward error correction scheme etc. are subject to change by reconfiguration procedure. The procedure is fairly slow introducing latency of the order of 100 ms. Finally, in a dynamic configuration the transport format attributes of the channel, e.g. modulation, forward error correction scheme etc. are subject to change by signaling on associated control channels. The procedure is fairly fast relative to semi-static reconfiguration and may introduce a delay of the order of several sub-frames (1 sub-frame~0.5 ms). Dynamic configuration

TABLE 2

| Logical (LCH) or Transport Channel (TrCH) type vs. channel characteristic and mapping | | Channel characteristic | | | | |
|---|---|---|---|---|---|---|
| | | Data Type | Transmission Type | Direction: Uplink (UL) or Downlink (DL) | Identification method | Mapping (LCH -> TrCH) |
| LCH | BCCH (Broadcast Control CHannel) | system information (broadcast) | N/A | DL | N/A | BCCH -> Evolved-BCH |
| | CCCH (Common Control CHannel) | common service control (unicast) | N/A | UL or DL | N/A, Note: this logical channel is mainly used for transmission of control plane information prior to identifier assignment to UE by radio access network | CCCH -> SDCH (in downlink direction only), CACH |
| | DCCH (Dedicated Control CHannel) | dedicated service control (unicast) | N/A | UL or DL | N/A | DCCH -> SDCH, SUCH |
| TrCH | Evolved-BCH (Evolved Broadcast CHannel) | N/A | Common channel with static configuration | DL | N/A due to broadcast data type | N/A |
| | CACH (Contention Access CHannel) | N/A | Common channel with semi-static configuration and contention-based access | UL | Layer 2 inband when carrying DCCH, N/A otherwise | N/A |
| | SDCH (Shared Downlink CHannel) | N/A | Shared channel with dynamic configuration and scheduled access | DL | Layer 1 outband | N/A |
| | SUCH (Shared Uplink CHannel) | N/A | Dedicated channel with semi-static configuration | UL | Layer 1 outband | N/A |

It can be noted that legacy FACH is not used and that shared channels are used instead of legacy DCH. It is assumed that associated physical channels in downlink direction are used may be carried out so as to optimally match transmission format to temporal variations of radio channel in which case it may be referred to as link adaptation.

Information that may be transmitted by this channel is given in the table below:

TABLE 3

|  | Control signaling for downlink | Control signaling for uplink |
|---|---|---|
| Physical control | Demodulation<br>Chunk allocation information<br>Data modulation<br>Transport block size | Transmission power control bits<br>Transmission timing control bits<br>ACK/NACK bit for the reservation<br>channel and fast access channel |
| L2 control | Scheduling<br>  UE identity<br>H-ARQ<br>  H-ARQ process information<br>  Redundancy version<br>  New data indicator | Scheduling<br>  UE identity<br>  Chunk allocation information<br>  Data modulation<br>  Transport block size<br>H-ARQ<br>  ACK/NACK |

It can be seen from the table that UE identification information is contained in both downlink and uplink directions. Thus, by virtue of Layer 1 outband identification, having decoded the data on the SCSCH and having determined that the identifier transmitted on the associated physical channel corresponds to the identifier assigned to the UE during the RRC connection establishment procedure, the UE can receive physical channels on which respective shared transport channels are mapped and further process Layer 2 PDUs (Protocol Data Units) corresponding to SDCH and SUCH shared transport channels. Identification for CACH transport channel is analogous to the identification for RACH transport channel in E-UTRA. It can be concluded that identification is applicable to common and shared transport channels (CACH, SDCH and SUCH) apart from evolved broadcast common transport channel (Evolved-BCH). Identification for said common transport channels is of L2 inband type, while the identification for shared transport channels is of Layer 1 outband type.

From the definitions of "Layer 2 inband" and "Layer 1 outband" identification one could infer that there is one and only one identifier per UE. Hence, once a Signaling Radio Bearer has been established, the UE has been assigned identifier that can be used for Traffic Radio Bearer as well. However, it is possible that multiple identifiers per UE are defined and used per configured transport channel.

Spectrum Allocation

With respect to stand-alone operation of the mobile terminals spectrum allocations of different sizes (e.g. 1.25 MHz, 2.50 MHz, 5.00 MHz, 10.00 MHz, 15.00 MHz and 20.00 MHz) have been suggested in 3GPP TR 25.912, "Requirements for Evolved UTRA (E-UTRA) and Evolved UTRAN (E-UTRAN)", version 7.1.0 (available at http://www.3gpp.org). It can be shown that data rate of evolved Primary Common Control Physical Channel (P-CCPCH—in legacy system, the BCH transport channel is mapped to the P-CCPCH) varies depending on size of spectrum allocation (as indicated in the table below), assuming that configuration of Evolved Broadcast Transport Channel is semi-static.

TABLE 4

| [MHz] | 1.25 | 2.50 | 5.00 | 10.00 | 15.00 | 20.00 |
|---|---|---|---|---|---|---|
| [kbps] | 4.00 | 8.00 | 16.00 | 32.00 | 48.00 | 64.00, |

It can concluded that the UE reading time for reading a predetermined amount of data from the physical channels depends upon spectrum allocation. Therefore, for smaller spectrum allocations, the UE reading time and thereby power consumption is increased. Furthermore, when the data size implies the transmission of the data over several transmission time intervals (TTIs), the UE has to power its receiver to receive data at all TTIs in which the data is provided. For larger spectrum allocations, the UE reading time is decreased, but if several data portions are sent in one TTI, UE may need to decode irrelevant portions in that TTI, since the receivers may typically only be tuned to receive data of a complete TTI. This may also lead to unnecessarily increased UE power consumption.

The potential shortcomings outlined above are illustrated in FIGS. 8 and 9 for the transmission of broadcast system information (BSI), which is typically partitioned into system information blocks (SIBs) in UMTS (FIG. 7). From FIG. 8, it can be recognized that for a spectrum allocation size of 5.00 MHz, the UE has to receive contents of the broadcast control channel BCCH over two successive TTIs to acquire information contained in SIB8, even though possibly MIB (at a given time instant) and SIB7/9/10 may not be of interest for the UE. Also, for larger spectrum allocations, e.g. of the size 10.00 MHz, as shown in FIG. 4, the UE decodes the master information block MIB and SIB1. In addition, the UE also decodes SIB2 and SIB3 even though the contents of these information blocks may not be necessary for system access or elementary mobility functions.

SUMMARY OF THE INVENTION

The object of the invention is to suggest an improved method for broadcasting broadcast system information.

The object is solved by the subject matter of the independent claims. Advantageous embodiments of the invention are subject matters to the dependent claims.

According to an aspect of the invention, different partitions of broadcast system information are mapped to a shared transport channel or a broadcast transport channel for transmission. According to an embodiment of the invention, the mapping may take into account parameters inherent to the mobile terminals to which the broadcast system information is to be transmitted and/or parameters inherent to the different partitions of broadcast system information.

In an embodiment of the invention, a method for transmitting broadcast system information in a radio access network of a mobile communication system is provided. According to the method, system information blocks of a broadcast control logical channel is mapped to a shared transport channel or a broadcast transport channel depending on a property of a respective system information block or the mobile terminals to receive the broadcast system information, and the system information blocks are transmitted via the shared transport channel and the broadcast transport channel, respectively.

For example, the intrinsic property of a system information block may be at least one of the temporal variability of the information contained in the system information block, the size of the system information block, the necessity of the information comprised in the system information block for system access, and the necessity of the information comprised in the system information block for tracking user location within the mobile communication system.

Examples for an intrinsic property of the mobile terminals may be a capability to support an optional feature within the mobile communication system.

In another embodiment of the invention, a master information block of a broadcast control logical channel is transmitted periodically via the broadcast transport channel. The master information block may comprise control information associated to a respective one of the system information blocks. The associated control information may indicate whether a respective system information block is mapped to the broadcast transport channel or the shared transport channel.

In case a system information block is mapped to the shared transport channel, in a variation of the embodiment, the associated control information comprises transmission format and timing of a respective system information block transmitted via the shared transport channel.

In a further variation, the associated control information specifies at least the position of the respective system information block on the broadcast transport channel, the time interval at which the respective system information block is transmitted and a timer value- or value tag-based update mechanism to be utilized to update the information of the respective system information block.

In a further embodiment of the invention the control information is transmitted on a control channel associated to the shared data channel. The control information may indicate to the transmission format and timing of a respective system information block transmitted via the shared transport channel.

In a variation of the embodiment, the control information further comprises identification of the logical channel-to-transport channel mapping.

In another embodiment of the invention part of control information is transmitted in the headers of shared transport channel packets and comprises an identification of the logical channel to transport channel mapping.

In both embodiments above, the identification of the logical channel-to-transport channel mapping may be made by including a plurality of configured or default identifiers to the control information as transmitted on master information block.

In a further embodiment of the invention the system broadcast information comprises information on the configuration of at least one shared transport channel of a neighboring radio cell.

Another embodiment of the invention relates to the reception of broadcast system information in a radio access network of a mobile communication system by a mobile terminal. The mobile terminal may receive a master information block of a broadcast control logical channel via a broadcast transport channel. The master information block may comprise control information associated to a respective one of a plurality of system information blocks used to convey the broadcast system information. Further, the associated control information may indicate to the mobile terminal whether a respective system information block of a plurality of system information blocks conveying the broadcast system information is mapped to the broadcast transport channel or a shared transport channel. The mobile terminal may receive system information blocks of a broadcast control logical channel on a shared transport channel or a broadcast transport channel according to the indication in the master information block.

In case a system information block is to be received via the shared transport channel, a variation of the embodiment foresees comprising a configuration of the shared transport channel to which the system information block is mapped, further associated control information in the master information block, and identifying the shared transport channel on which the system information block is mapped among a plurality of shared transport channels based on the indication in the associated control information of the master information block to receive the system information block via the identified shared channel and transmitted configured or default identifier. The configuration may for example be a set of transmission format parameters. The indication of the mapping of individual SIBs to the shared transport channel may for example be made by using configured or default identifiers, each identifying an associated transport channel in the system.

In another embodiment of the invention the mobile terminal may receive control information on a physical control channel associated to the shared data channel. The associated control information may indicate the transmission format and timing of a respective system information block transmitted via the shared transport channel. The mobile terminal may utilize the indicated transmission format and timing for receiving the respective system information block via the shared transport channel.

Further, in an embodiment of the invention, the system broadcast information received by the mobile terminal may also comprise information on the configuration of at least one shared transport channel of a neighboring radio cell and the mobile terminal may use the information on the configuration of at least one shared transport channel of a neighboring radio cell for receiving broadcast system information in the neighboring radio cell, in case the mobile terminal is handed over to the neighboring radio cell.

Another embodiment of the invention provides a transmission apparatus in a radio access network for transmitting broadcast system information in the radio access network of a mobile communication system. The transmission apparatus may comprise a processor to map system information blocks of a broadcast control logical channel to a shared transport channel and a broadcast transport channel depending on a property of a respective system information block or the mobile terminals to receive the broadcast system information. Further, it may comprise a transmitter to transmit the system information blocks via the shared transport channel and the broadcast transport channel, respectively.

In a variation of the embodiment, the transmission apparatus is configured to perform the steps of the method for transmitting broadcast system information according to one of the various embodiments and variations described herein.

A further embodiment of the invention relates to a mobile terminal for receiving broadcast system information in a radio access network of a mobile communication system. According to this exemplary embodiment the mobile terminal comprises a receiver for receiving a master information block of a broadcast control logical channel via a broadcast transport channel. Moreover, the mobile terminal may be configured with a processor for obtaining control information from the master information block. This control information is associated to a respective one of a plurality of system information blocks used to convey the broadcast system information and may indicate whether a respective system information block is mapped to the broadcast transport channel or a shared transport channel. The receiver may further receive system information blocks of a broadcast control logical channel on a shared transport channel or a broadcast transport channel according to the indication in the master information block.

The mobile terminal according to another embodiment of the invention may be configured to perform the steps of the method for receiving broadcast system information according to one of the different embodiments and variations described herein.

Other embodiment of the invention relates to the implementation of the different aspects of the invention in software. Therefore, an embodiment of the invention provides a computer-readable medium storing instructions that, when executed by a processor of a transmission apparatus, causes the transmission apparatus to transmit broadcast system information in a radio access network of a mobile communication system. In this embodiment, the transmission apparatus is caused to transmit broadcast system information by mapping system information blocks of a broadcast control logical channel to a shared transport channel or a broadcast transport channel depending on a property of a respective system information block or the mobile terminals to receive the broadcast system information, and by transmitting the system information blocks via the shared transport channel and the broadcast transport channel, respectively.

The computer-readable medium according to another embodiment of the invention may further store instructions that cause the processor of the transmission apparatus to execute the steps of the method for transmitting broadcast system information according to one of the embodiments and variants described herein.

A further embodiment of the invention provides a computer-readable medium storing instructions that, when executed by a processor of a mobile terminal, causes the mobile terminal to receive broadcast system information in a radio access network of a mobile communication system.

The mobile terminal may be caused to receive broadcast system information by receiving a master information block of a broadcast control logical channel via a broadcast transport channel and by receiving system information blocks of a broadcast control logical channel on a shared transport channel or a broadcast transport channel according to the indication in the master information block. The master information block may comprise control information associated to a respective one of a plurality of system information blocks used to convey the broadcast system information. The associated control information indicates whether a respective system information block is mapped to the broadcast transport channel or a shared transport channel.

The computer-readable medium in another embodiment of the invention further stores instructions causing the processor of the mobile terminal to execute the steps of the method for receiving broadcast system information according to one of the various embodiment and variants thereof described herein.

BRIEF DESCRIPTION OF THE FIGURES

In the following the invention is described in more detail in reference to the attached figures and drawings. Similar or corresponding details in the figures are marked with the same reference numerals.

FIGS. 7 to 9 show examples of transmissions of Broadcast System Information (BSI) in System Information Blocks (SIBs) at different using different channel bandwidths.

DETAILED DESCRIPTION OF THE INVENTION

Figure 1:
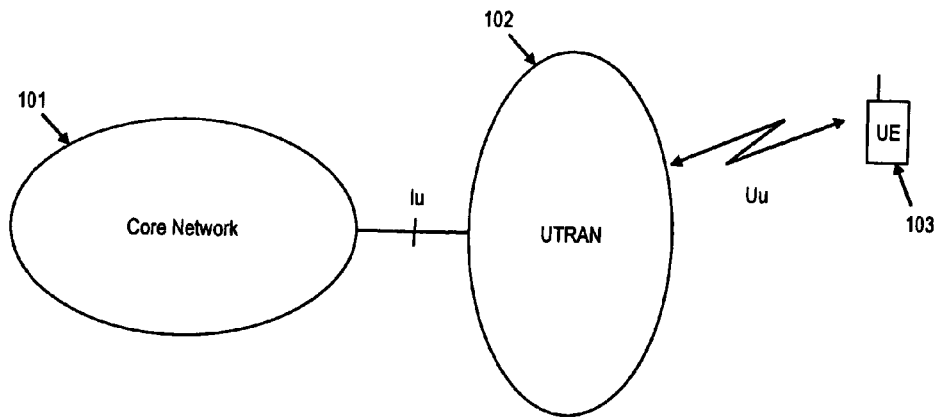
FIG. 1 shows the high-level architecture of UMTS.
Figure 2:
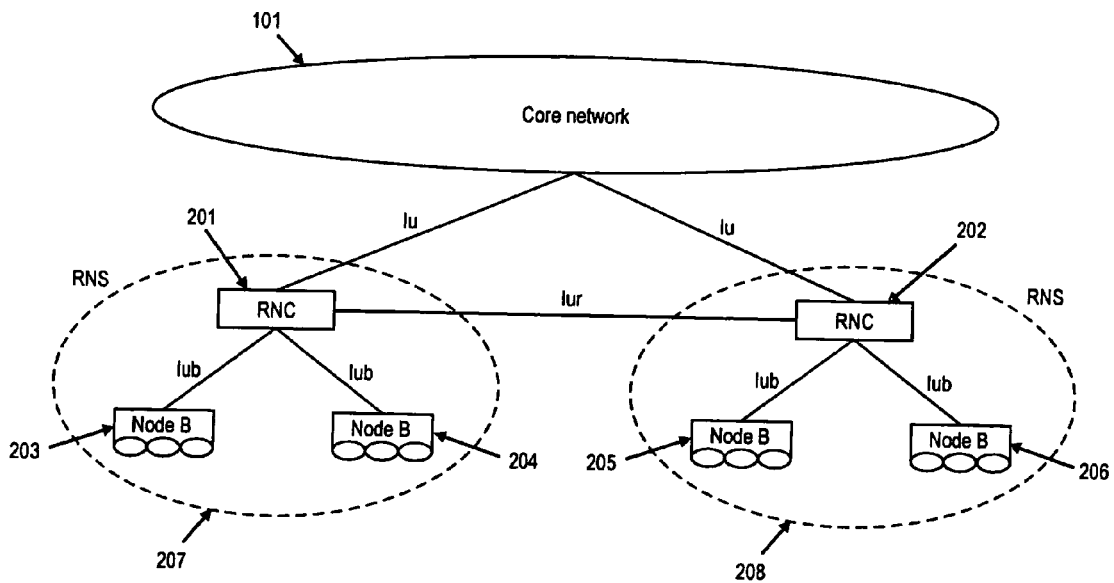
FIG. 2 shows the architecture of the UTRAN according to UMTS R99/415.
Figure 3:
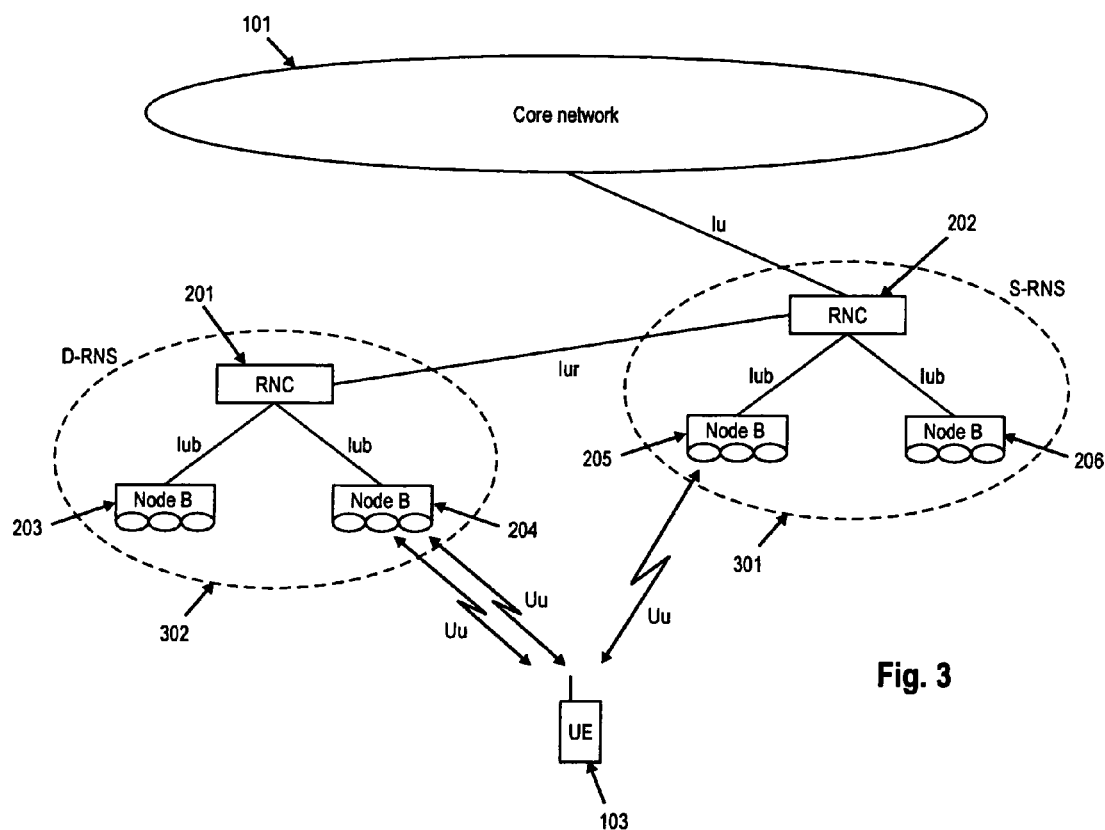
FIG. 3 shows a Drift and a Serving Radio Subsystem in a UMTS network.
Figure 4:
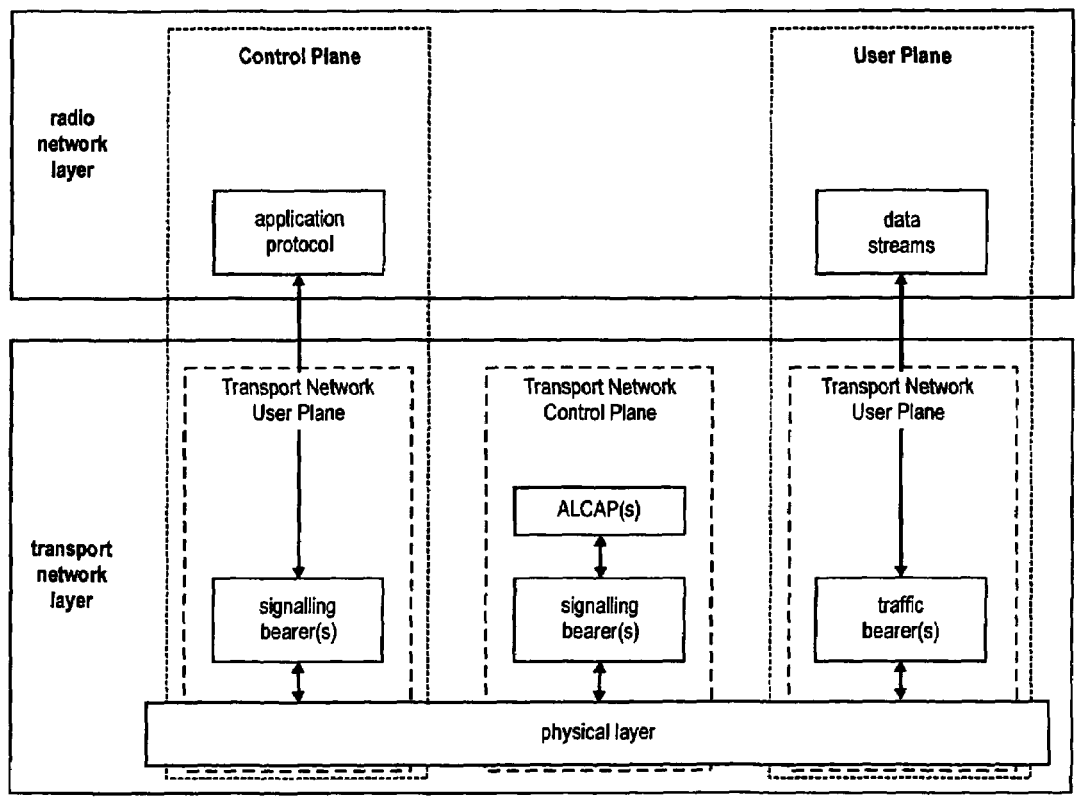
FIG. 4 shows an overview of the protocol model of the UTRAN in an UMTS network.
Figure 5:
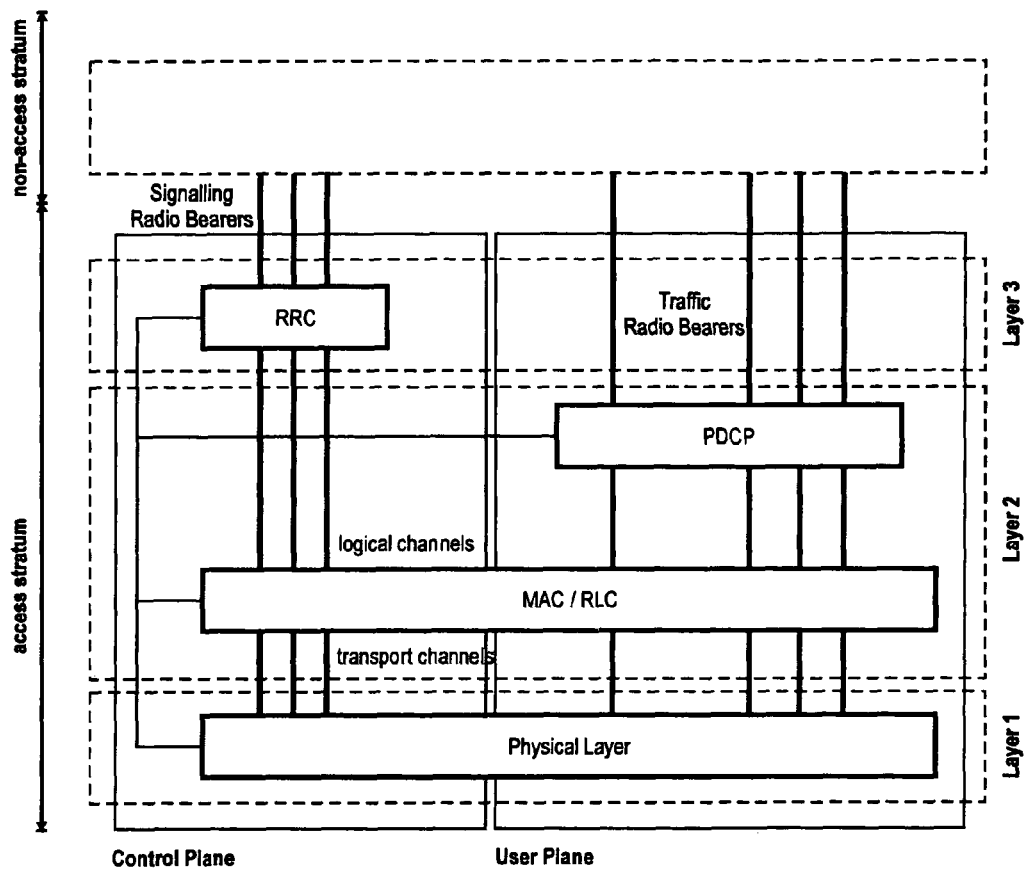
FIG. 5 shows an overview of the radio interface protocol architecture of the UTRAN.

The following paragraphs will describe various embodiments of the invention. For exemplary purposes only, most of the embodiments are outlined in relation to a UMTS communication system and the terminology used in the subsequent sections mainly relates to the UMTS terminology, as the invention may be advantageously used in this type of communication system. However, the terminology used and the description of the embodiments with respect to a UMTS system is not intended to limit the principles and ideas of the invention to such system.

Also the detailed explanations given in the Technical Background section above are intended to better understand the mostly UMTS specific exemplary embodiments described in the following and should not be understood as limiting general ideas underlying the invention to the described specific implementations of processes and functions in a mobile communication network.

According to one aspect of the invention, it is proposed to map broadcast system information of logical channels to a shared transport channel and/or to a broadcast transport channel. Broadcast system information may for example be information transmitted over a broadcast control logical channel.

In an embodiment of the invention, the mapping of different portions of the broadcast system information, also referred to as system information blocks herein, to either one of the two transport channels is based on a certain criterion or certain criteria. For example, criteria that may be used as a basis for the mapping decision may be intrinsic property of a system information block or an intrinsic property of the mobile terminals to which the system information is to be broadcast.

Examples for an intrinsic property of a system information block may be temporal variability of the information contained in the system information block or the size of the system information block. Another intrinsic property of a system information block is for example the necessity of the information comprised in the system information block for system access or the necessity of the information comprised in the system information block for tracking user location within the mobile communication system.

An intrinsic property of the mobile terminals may for example be the capability of terminals to support feature(s) defined optional within the mobile communication system.

The mapping of system information blocks to a shared or broadcast transport channel can be advantageous in that the acquisition of this information by mobile terminals in terms of terminal processing time and power consumption may be optimized. Other advantages that may be achieved when applying the invention may be improved reading time for broadcast system information of mobile terminals for all sizes of standalone spectrum allocations, greater flexibility of operators in configuring transport channels for broadcast and increased scheduling efficiency of system information, which may be a result from mapping system information to a shared transport channel.

Another aspect of the invention is the behavior of the mobile terminals to receive the broadcast system information. According to another embodiment of the invention, the mobile terminals will receive a master information block on the broadcast transport channel, which indicates the mapping of individual SIBs to either the broadcast transport channel or the shared transport channel. Based on the indication of the mapping used, the mobile terminals will receive the SIBs either on the broadcast control channel or the shared control channel. In another embodiment of the invention, Layer 1 outband or Layer 2 inband identification is used for providing the mobile terminals with control information necessary to appropriately receive the SIBs, as will be outlined in more detail below.

In the following the structure of system broadcast information and their allocation to different System Information Blocks (SIBs) according to an exemplary embodiment of the invention is outlined considering a UMTS system. The structure of the information transmitted on the broadcast control channel—a logical channel—may be tree-like. A so-called Master Information Block (MIB) forms the root of the tree structure, whereas the so-called System Information Blocks (SIBs) represent its branches. The MIB information may be transmitted less frequently than the SIBs carrying the broadcast system information. The information in the MIB may also not need to be read by the individual terminals each time the MIB information is transmitted.

Figure 6:
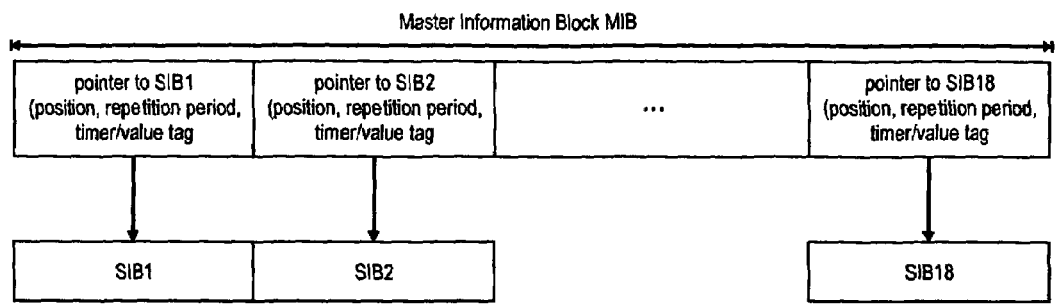
FIG. 6 shows the structure of a Master Information Block (MIB)

The structure of the information on the BCCH is shown for exemplary purpose in FIG. 6. One part of MIB may for example be reserved for information upon each System Information Block. The control information associated to a respective SIB and comprised in the reserved parts may have the following structure. Each control information associated to a SIB may indicate the position of SIB on the broadcast transport channel on which it is transmitted relative to common timing reference. Further, a repetition period of SIB may be indicated. This repetition period indicates the periodicity at which the respective SIB is transmitted. The control information may further include a timer value for timer-based update mechanism or, alternatively, a value tag for tag-based update of the SIB information.

For SIBs whose reference in MIB contains timer value, a mobile terminal may update system information after expiry of value indicated in timer field of MIB. For SIBs whose reference in MIB contains value tag, a mobile terminal may update system information after the value of tag as indicated in respective field of MIB has been changed with respect to the value from the previous update. Respective exemplary MIB formats according to different embodiments of the invention will be described with reference to FIGS. 11 and 13 below.

The table below shows an exemplary overview of the categorization and types of system information blocks in an UMTS legacy system (see 3GPP TS 25.331, "Radio Resource Control (RRC)", version 6.7.0, section 8.1.1, incorporated herein by reference; available at http://www.3gpp.org) that may be used in the different embodiments of the invention described herein. In this example, the classification of the system broadcast information into the different SIBs is based on the content and temporal variability.

TABLE 5

| SIB | Content | Temporal Variability |
|---|---|---|
| SIB1 | NAS info, UE timers/counters | low |
| SIB2 | URA identity | low |
| SIB3 | Cell selection parameters | low |
| SIB4 | Cell selection par. for connected mode | low |
| SIB5 | Common physical channels configuration | medium |
| SIB6 | Common physical channels configuration | medium |
| SIB7 | Interference/dynamic persistence level | high |
| SIB11 | Measurement control | medium |
| SIB12 | Measurement control information for connected mode | medium |
| SIB13 | ANSI-41 info | low |
| SIB14 | Outer loop power control information | medium |
| SIB15 | Positioning information | low |
| SIB16 | Preconfiguration | medium |
| SIB17 | Configuration of shared physical channels in connected mode | high |
| SIB18 | PLMN IDs of neighboring cells | low |

The contents of the table illustrated above should be only considered as one possible example of the contents and classification of the broadcast system information. Also the classification of the frequency at which the different portions of the system information is broadcast and its classification into the different SIBs is intended to serve only for exemplary purposes and is not intended to limit the invention to this example. It is recognized that in the ongoing development and improvement of existing mobile communication systems, the content, format, periodicity of transmission, etc. may change.

Figure 10:
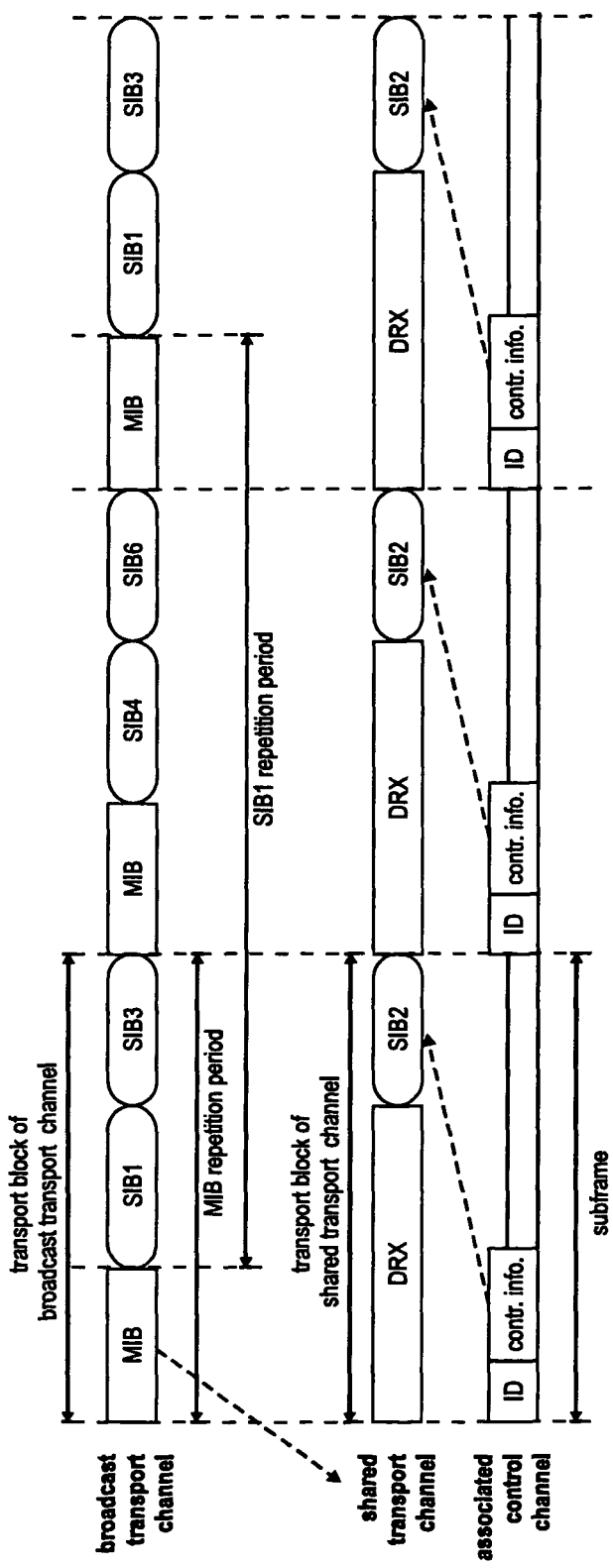
FIG. 10 shows an exemplary mapping of system information blocks of broadcast system information to a broadcast transport channel and a shared transport channel using Layer 1 outband identification according to an embodiment of the invention.

FIG. 10 shows an exemplary mapping of system information blocks of broadcast system information to a broadcast transport channel and a shared transport channel using Layer 1 outband identification according to an embodiment of the invention. In FIG. 10, the data mapped to three different channels, a broadcast transport channel, a shared transport channel and a physical control channel associated to the shared transport channel, is shown. The control channel is associated to the shared transport channel in that it contains control information describing transmission format and timing of the data on the shared transport channel. In another embodiment of the invention the parameters describing transmission format may define the format for an OFDMA based radio access as described in Tdoc R1-050604 of the 3GPP TSG RAN WG #1 ad hoc, "Downlink Channelization and Multiplexing for EUTRA", June 2005 (available at http://www.3gpp.org), incorporated herein by reference).

Further, the mobile terminal (or, equivalently, logical to transport channel mapping) to receive the system information may be designated by respective Layer 1 outband identification as discussed previously. Accordingly, the logical-to-transport channel mapping is indicated on the associated physical control channel (e.g. SCSCH).

The broadcast system information provided on the broadcast control logical channel (e.g. the BCCH in UMTS), is mapped to the shared transport channel and the broadcast transport channel of FIG. 10.

For the broadcast transport channel, three transport blocks are shown in FIG. 10. In the exemplary embodiment, a Master Information Block (MIB) is transmitted periodically (MIB repetition period). For example, the MIB may be transmitted at the beginning of each transport block or after a predetermined time span, such as a given number of transmission time intervals (TTIs). Further, a transport block may comprise one or more System Information Blocks (SIBs). A SIB comprises a portion of the system broadcast information to be transmitted. For example, each SIB may comprise a predetermined or configurable set of information of a certain category as exemplified in the Table 5.

Figure 11:
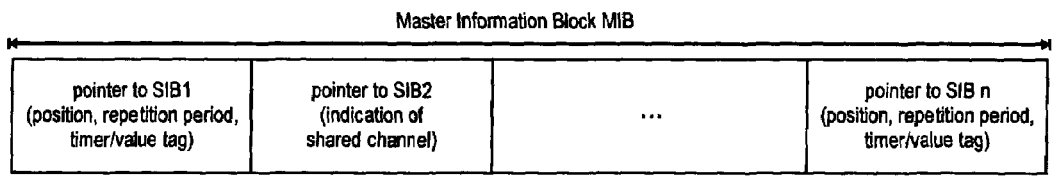
FIG. 11 shows an exemplary format of a Master Information Block used in the mapping of system information blocks in FIG. 10 according to an embodiment of the invention.

The MIB used in the exemplary embodiment shown in FIG. 10 is illustrated in FIG. 11 in further detail. The structure of system broadcast information according to this embodiment of the invention is also tree-like, as has been outlined above. The MIB comprises different partitions of control information each of these partitions being associated to a respective SIB.

For those SIBs that are mapped to the broadcast transport channel for transmission, the control information associated to a respective SIB may have the following structure. Each control information associated to a SIB (pointer to SIB #n) indicates the position of the SIB on the broadcast transport channel on which it is transmitted relative to common timing reference. Further, a repetition period of SIB indicating the periodicity at which the respective SIB is transmitted may be indicated. In the exemplary embodiment shown in FIG. 10, the control information in the MIB associated to SIB1, SIB3, SIB 4 and SIB6 have this structure.

In contrast to SIB1, SIB3, SIB 4 and SIB6, SIB2 is transmitted via the shared transport channel. The MIB control information relating to SIB2 has a different structure than the control information for the set of SIBs. According to the exemplary embodiment, the control information for SIB2 in the MIB comprises an indication of the shared transport channel on which SIB2 is transmitted. This indication is illustrated by the dashed arrow pointing from the MIB to the shared transport channel in FIG. 10.

Based on the control information in the MIB, the mobile terminals may recognize which SIBs are transmitted and to which channel they are mapped. I.e. in the exemplary embodiment, the mobile terminals determine that SIB1, SIB3, SIB4 and SIB6 are mapped to and transmitted on the broadcast transport channel, while SIB2 is mapped to and transmitted on the shared transport channel.

As indicated above, Layer 1 outband identification is used for indicating the logical channel-to-transport channel mapping to the receiving mobile terminals. For this purpose and identification of the mapping is transmitted on the associated control channel (see "ID"). This identification may for example use default or configured identifiers of the logical channel to which a respective transport channel is to be mapped on the receiving side. These identifiers may be transmitted by in the MIB.

| The identifiers may for example be HEX-values: | |
|---|---|
| 0x0000 00FF | logical channel BCCH (Broadcast Control Channel) is mapped upon SDCH, |
| 0x0100 01FF | logical channel PCCH (Paging Control Channel) is mapped upon SDCH and |
| 0x0200 FFFF | logical channel DCCH/DTCH (Dedicated Control Channel/ Dedicated Transport Channel) is mapped upon SDCH |

The identifiers used may be default values or may be configured by the system.

The control channel associated to the shared transport channel comprises control information, which indicates the scheduling of the SIB on the shared transport channel. The control information may at least indicate temporal position of the SIB(s) mapped to the shared channel on that channel for a respective SIB. In another embodiment of the invention the control information on the associated control channel is scheduling information as shown in Table 3 above and may comprise information on chunk allocation, data modulation and transport block size. According to an embodiment of the invention the transmission format parameters may be defined as in in Tdoc R1-050604 3GPP TSG RAN WG1 ad hoc "Downlink Channelisation and Multiplexing for EUTRA". mentioned above, Hence, in the exemplary embodiment shown in FIG. 10, the MIB control information indicate to the mobile terminal that SIB2 has been mapped to the shared transport channel, while the control information for SIB on the associated control channel indicates the temporal position of SIB2 on the shared channel to a receiving mobile terminal and transmission format.

According to one embodiment of the invention, the temporal position can be given as dynamically changing scheduling information with respect to common system timing reference. An exemplary implementation is for example described in the TS 25.331 "Radio Resource Control (RRC)" mentioned above. As explained above, the transmission format may indicate at least chunk allocation, data modulation and transport block size. Finally, although not explicitly mentioned, a configuration of the associated physical control channel (e.g. SCSCH) may also be necessary.

Returning to the transmission of broadcast system information in UMTS systems for exemplary purposes only, Layer 1 outband identification and transmission of scheduling information are specific for shared downlink transport channel while scheduling information of system information blocks conveyed via broadcast transport channel is transmitted within the Master Information Block of the broadcast transport channel, that is within Layer 2 transport blocks. The configuration of the broadcast transport channel may be for example semi-static, while the configuration of the shared downlink transport channel may be semi-static or dynamic. The flexibility of dynamic configuration of the shared transport channel in this embodiment of the invention may be advantageous from radio resource utilization perspective since fast scheduling of broadcast system information could be efficiently supported.

In an exemplary embodiment of the invention, the shared transport channel may be the Shared Downlink CHannel (SDCH) of a UMTS system, while the broadcast transport channel may be the Broadcast CHannel (BCH); the control channel associated to the SDCH may be the Shared Control Signaling Channel (SCSCH).

Figure 12:
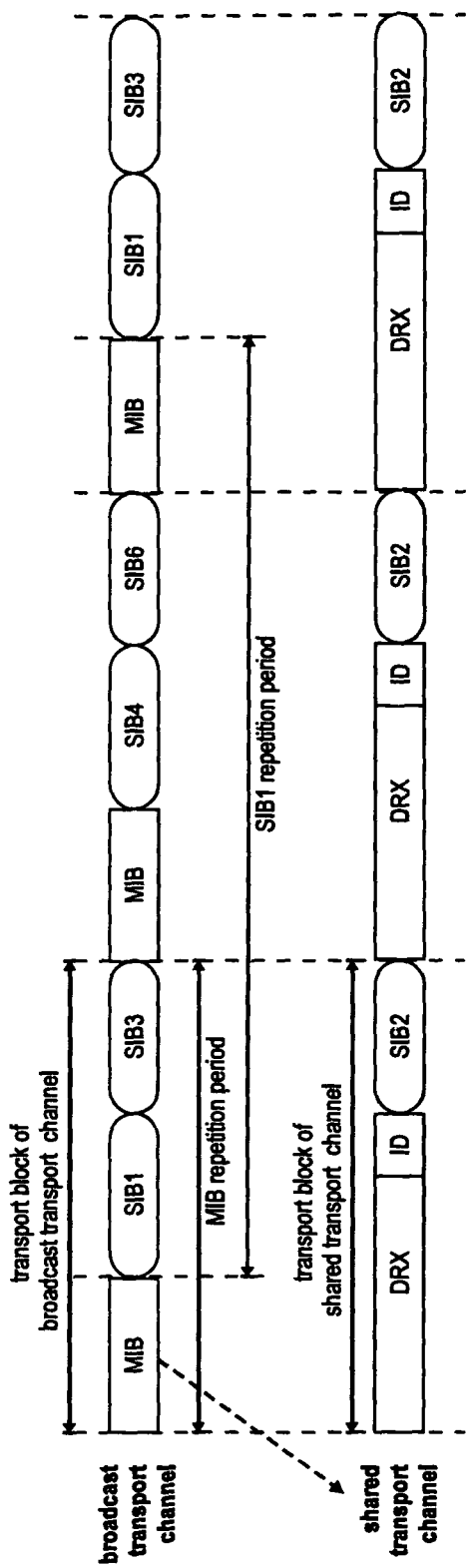
FIG. 12 shows an exemplary mapping of system information blocks of broadcast system information to a broadcast transport channel and a shared transport channel using Layer 2 inband identification according to an embodiment of the invention.

FIG. 12 shows another exemplary mapping of system information blocks of broadcast system information to a broadcast transport channel and a shared transport channel using Layer 2 inband identification according to another embodiment of the invention.

In the exemplary embodiment illustrated in FIG. 12, a shared channel is used without the need of an associated (physical) control channel for identification. As in the embodiment of the invention described with respect to FIGS. 10 and 11, also in the embodiment shown in FIG. 12 broadcast system information is mapped to a broadcast transport channel and a shared transport channel. The identifier ("ID") indicating the logical channel-to-transport channel mapping and semi-static configuration information (timing and transmission format) of the shared channel (e.g. SDCH) and configuration of associated physical control channel (e.g. SCSCH) are transmitted inband. This means that both pieces of information are transmitted at Layer 2. For example, the identification ("ID") may be provided within the header of Layer 2 packets of the shared transport channel, while the configuration information of shared channel may be provided within MIB.

Figure 13:
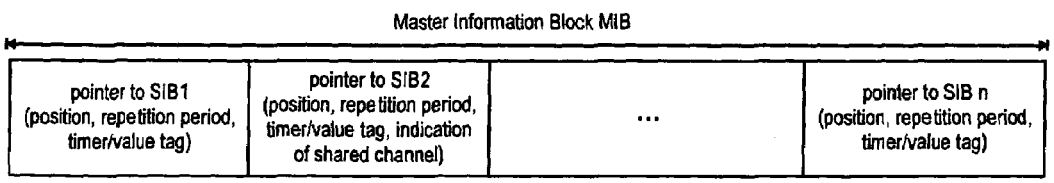
FIG. 13 shows an exemplary format of a Master Information Block used in the mapping of system information blocks in FIG. 12 according to an embodiment of the invention.

The identifier ID may be a default identifier or may be configured/assigned through MIB of the broadcast transport channel, as described above. FIG. 13 shows an exemplary format of a Master Information Block used in the mapping of system information blocks in FIG. 12. The structure of the control information for SIBs mapped to the broadcast transport channel is similar to that in the MIB shown in FIG. 11. The MIB control information of the SIBs mapped to the shared transport channel may in addition comprise an indication of the shared transport channel to which they have been mapped respectively.

In the following paragraphs the mapping of the system information blocks transporting the individual portions of the broadcast system information of the broadcast control logical channel according to different embodiments will be described. In the following embodiments of the invention described with respect to FIG. 14 to 18, the broadcast system information is transmitted in system information blocks that are mapped to a broadcast transport channel or a shared transport channel using either Layer 1 outband identification (FIGS. 10 and 11) or Layer 2 inband identification (FIGS. 12 and 13). As will be explained in the following, the mapping may be based for example on a property/properties inherent to a respective SIB or the mobile terminals to receive the SIBs.

FIGS. 8 and 9 show the transmission of broadcast information over broadcast transport channel on a time axis. FIG. 8 is plotted for spectrum allocation of 5 MHz and broadcast data rate of 16 kbps. FIG. 9 is plotted for spectrum allocation of 10 MHz and broadcast data rate of 32 kbps.

In FIG. 14 to 18, the spectrum allocation of either 5 MHz or 10 MHz is assumed and respective data rates of 16 or 32 kbps are (usually unevenly) distributed between broadcast and shared transport channel. By mapping broadcast system information to broadcast and shared transport channels a more flexible transmission scheme for broadcast system information may be in comparison to cases where broadcast system information is mapped only to a broadcast transport channel. For example, in FIG. 15 the data rate of broadcast and shared transport channel is divided in ratio 3:1 since the resulting data rate on the shared channel is sufficient to transmit SIB1 over the shared transport channel in one TTI, as will be explained below.

It should be noted that the actual resource utilization is not precisely plotted in FIGS. 8, 9 and 14 to 18.

According to one embodiment of the invention, a criterion based on which the mapping of SIBs to either a shared transport channel or a broadcast transport channel is decided, may be the importance of the information of a respective SIB for mobile terminals.

Information important for mobile terminals may for example be system information that is necessary to be received, stored and kept up-to-date by mobile terminal in order to perform system access and elementary mobility procedures.

Considering for exemplary purposes only a UMTS system, system access may designate the procedure aimed at establishing signaling connection (signaling radio bearer). Hence, in this exemplary scenario the important information is information necessary for the mobile terminal to establish a signaling connection. Elementary mobility procedures on the other hand designate the procedures aimed at tracking user location by the network on tracking area level—without established signaling connection—and on cell level—with established signaling connection.

Following the definition of important information and considering the exemplary classification of broadcast system information as shown in Table 5, SIB1, SIB2, SIB3, SIB5, SIB6, SIB17 and SIB18 may be classified as information important for mobile terminals, since they are necessary for performing system access and elementary mobility procedures. On the other hand, for example SIB13 and SIB15 may be classified as information not important (optional) for mobile terminals since they are not necessary for performing system access and elementary mobility procedures.

Figure 14:
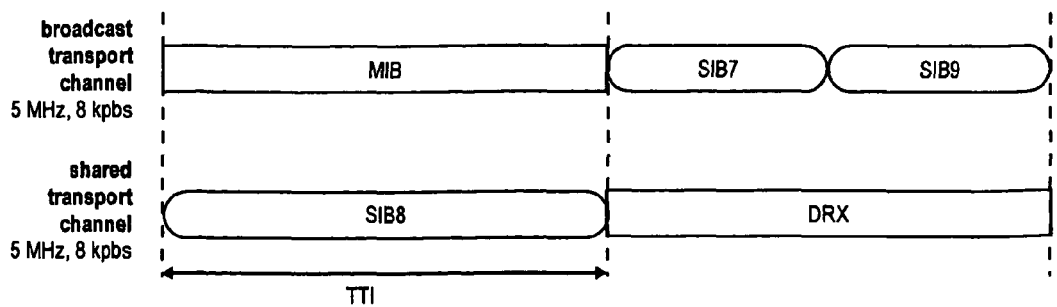
FIGS. 14 to 17 show different examples of mapping of system information blocks to a shared transport channel and a broadcast transport channel based on different criteria according to different embodiments of the invention.

FIG. 14 shows an exemplary mapping of system information blocks to a shared transport channel having a 5 MHz spectrum allocation and a data rate of 8 kbps and a broadcast control channel also having a 5 MHz spectrum allocation and a data rate of 8 kbps according to an embodiment of the invention. FIG. 14 proposes a mapping overcoming the problems discussed with respect to FIG. 8, where the mobile terminal had to receive two successive TTIs to obtain the important SIB8. In FIG. 14, SIB8 is now mapped to the shared transport channel, which allows transmitting SIB8 in a single TTI, thereby reducing power consumption of the mobile terminal. Further, the MIB can be transmitted simultaneously (i.e. in the same TTI) as SIB8 which allows the mobile terminal to acquire the important information in SIB8 faster compared to the scenario in FIG. 8.

In the exemplary embodiment shown in FIG. 14, the mapping of SIB8 to the shared channel has been based on the importance of the information contained in SIB8 for the mobile terminals. Another criterion may be the size of the SIBs. For example, SIBs larger than a predetermined threshold may be mapped to the shared transport channel. For example, this option may be of advantage, if several TTIs would be required for the transmission of the SIB of broadcast transport channel and/or the shared transport channel can be sent with higher data rate than that used for the broadcast transport channel.

Figure 15:
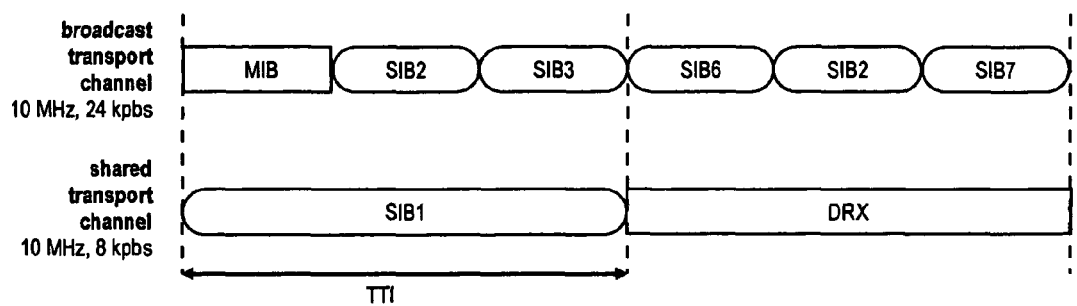

FIG. 15 shows an exemplary mapping of system information blocks to a shared transport channel having a 10 MHz spectrum allocation and a data rate of 24 kbps and a broadcast control channel also having a 10 MHz spectrum allocation and a data rate of 8 kbps according to an embodiment of the invention. This exemplary embodiment illustrates an improvement of the system information allocation in FIG. 9, where SIB1 has been the only SIB containing information relevant for the mobile terminal (the MIB may not be read every time it is transmitted). Though the mobile terminal may only be interested in the content of SIB1 of FIG. 9, it would need to read the whole content broadcast on the broadcast transport channel within a TTI, since receivers may typically only be tuned to receive data within a whole TTI.

According to the embodiment illustrated in FIG. 15, the SIB(s) comprising information important for the mobile terminals are mapped to the shared transport channel, while SIBs carrying optional information, i.e. information not important for the mobile terminals are mapped to the broadcast transport channel. Assuming that the content of SIB2 and SIB3 in FIG. 15 is optional information and that the mobile terminal may not need to read the MIB in this TTI, the mobile terminal may only read the shared transport channel carrying SIB1 from the shared transport channel and may save power by not reading the broadcast transport channel in that TTI.

Further, considering that the data rates on shared transport channel and broadcast transport channel may vary from each other, another benefit of the mapping of SIBs to a shared transport channel offering a lower data rate than the broadcast transport channel may be an increase in the reliability of the transmitted information in the SIBs transmitted on the shared transport channel. Since a lower data rate may also imply a lower coding rate and/or a lower order modulation scheme being used compared to the configuration of the broadcast control channel, the information transmitted via the shared transport channel may have a higher reliability. In UMTS systems, the configuration of the broadcast transport channel may be static and hence its data rate may not be changed.

Another criterion that may be considered for mapping of SIBs to a shared transport channel or a broadcast transport channel may be the features supported by the mobile terminals within a certain cell. For example, if none of the mobile terminals currently present in a cell are supporting positioning based on GPS (Global Positioning System), the related SIB may be omitted from broadcast on the broadcast transport channel and may be instead transmitted via a shared transport channel. Advantageously, the SIB may be transmitted during discontinuous reception (DRX) periods on the shared transport channel, if mobile terminals supporting GPS connect/are handed over to the cell. Hence resources can be dynamically shared with user plane data.

Figure 16:
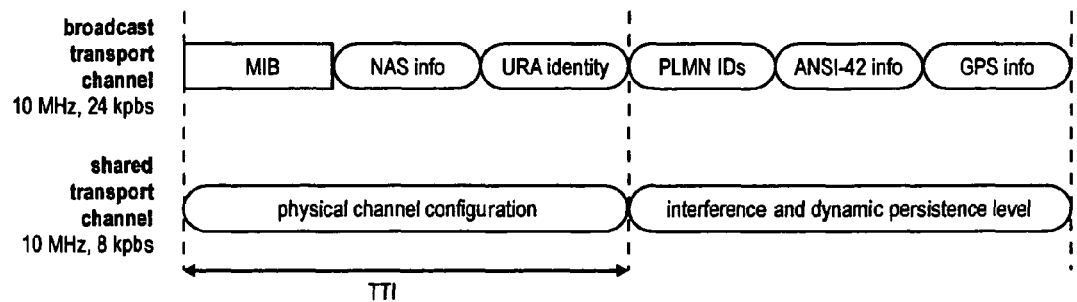

FIG. 16 shows a mapping of SIBs to a shared or broadcast transport channel based on the variability of the information in the respective SIB according to an embodiment of the invention. SIBs that comprise broadcast system information of high variability may be mapped to the shared transport channel. Considering a classification of broadcast system information as shown in Table 5 above, e.g. physical channel configuration, interference and dynamic persistence level may be considered SIBs comprising information undergoing frequent changes. Further, as indicated above, depending on the data rate distribution between the broadcast transport channel and the shared transport channel, the transmission of frequently changing SIBs via the shared transport channel may allow for lower repetition periods or alternatively increase the reliability of the transmission of the respective SIBs.

To generically classify information according to temporal variability, rates f1 and f2 (f1<f2) describing frequency of change of this information may be considered. For example, an information (SIB) may be classified to be of low temporal variability, if its rate of change f relates to f1 as f<=f1. Analogously, information may be of high temporal variability, if its rate of change f relates to f2 as f>=f2. Finally, information is of medium temporal variability, if its rate of change f relates to f1 and f2 as f1≦f≦f2.

Figure 17:
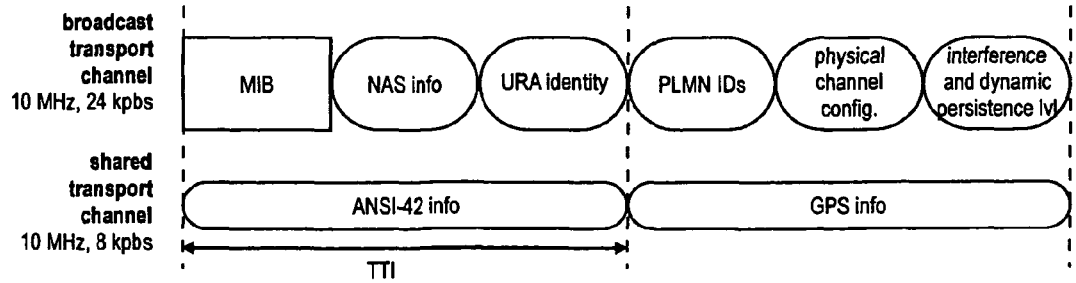

Another possible mapping of SIBs to a shared transport channel and a broadcast transport channel according to a further embodiment of the invention is shown in FIG. 17. In this exemplary embodiment only optional information (i.e. information not important for the mobile terminals) is mapped upon shared channel. The optional information may for example be ANSI 42 information or GPS information. This mapping may be beneficial in that the mobile terminals would only need to acquire necessary information from broadcast transport channel and without reading shared transport channel. Only if a mobile terminal would support a feature for which the optional information is needed, it may read the respective SIBs from the shared transport channel.

Figure 18:
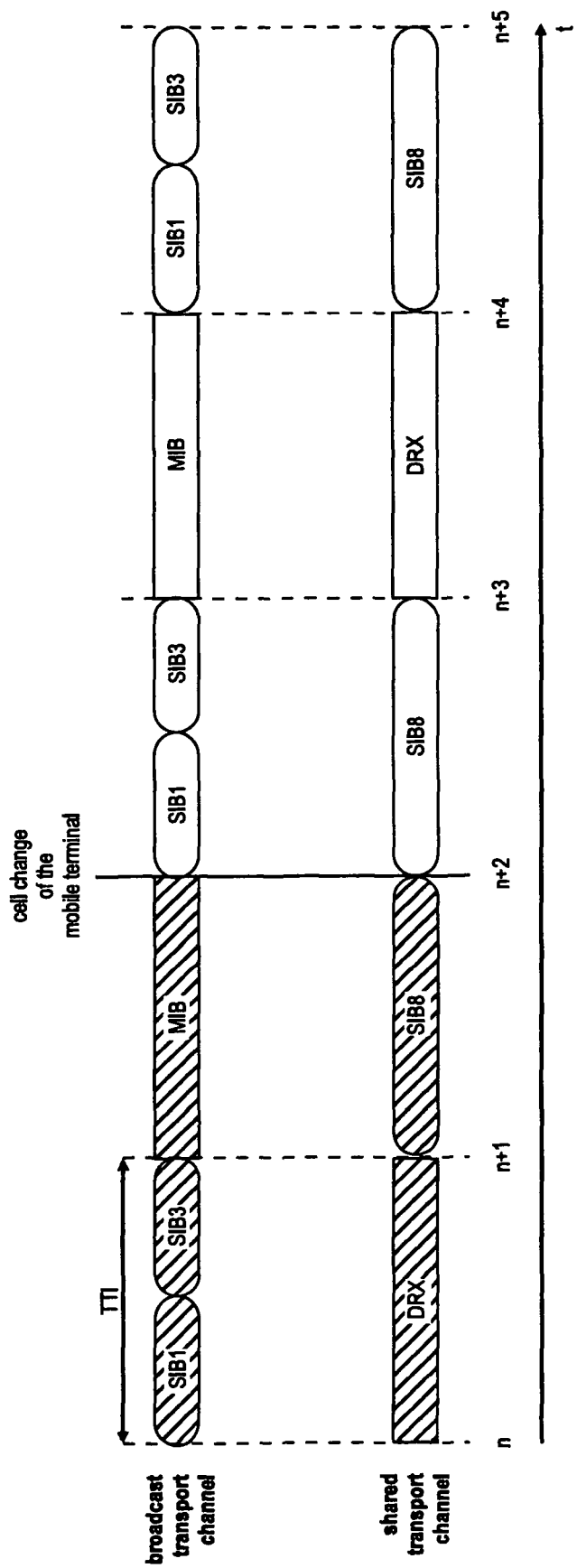
FIG. 18 shows a mapping of system information blocks of broadcast system information comprising information on a shared transport channel in a neighboring radio cell to a broadcast transport channel and a shared transport channel and a handover of a mobile terminal to the neighboring radio cell according to an embodiment of the invention.

In another embodiment of the invention, the configuration of shared transport channel used for the transmission of broadcast system information in neighboring cells may be broadcast to the mobile terminals of a cell. Accordingly, FIG. 18 shows a mapping of system information blocks of broadcast system information comprising information on a shared transport channel in a neighboring radio cell to a broadcast transport channel and a shared transport channel and a handover of a mobile terminal to the neighboring radio cell according to an embodiment of the invention. In the exemplary embodiment, it may be assumed that the shared transport channel in a respective cell is used to provide system broadcast information to the mobile terminals that is important information, i.e. information necessary to perform system access and elementary mobility procedures.

In FIG. 18, at the time instant n+1 (the time instants are given by the number of TTIs having past since a given starting time) the mobile terminal starts receiving the MIB via the broadcast transport channel. Further it may be assumed that SIB8 in each radio cell comprises information necessary to perform system access and elementary mobility procedures. The dashed blocks are intended to indicate, that the mobile terminal receiving the information is located in a source cell, when receiving the information. The MIB received in the TTI following time instant n+1 may comprise an indication to the shared transport channel at which SIB8 is broadcast in a neighboring cell(s). Alternatively, a SIB containing this information may be specified by the MIB (for example SIB3 read by the mobile terminal at the TTI starting at time instant n).

Upon the time instant n+2, the mobile terminal is handed over from its source cell to another cell, the target cell. Since it has already acquired the control information necessary to receive SIB8 on the shared transport channel, the mobile terminal may already read SIB8 from the shared transport channel of the target cell at time instant n+2. Hence, the mobile terminal may not need to receive the first MIB in the target cell transmitted at time instant n+3 on the broadcast transport channel to be able to read SIB8 from the shared transport channel at time instant n+4.

More generally, information on the configuration of the neighboring cells (including the target cell) may be provided as part of the broadcast system information within a cell. The configuration information on the neighboring cells may be for example included in a system information block or may be provided as part of the MIB to the mobile terminals of a radio cell. The configuration information may depend on the respective mapping used for transmission of the broadcast system information via the shared transport channel and the broadcast transport channel in a respective neighboring cell.

If a configuration as shown in FIG. 10 is used, the MIB may comprise chunk allocation and possibly modulation format, transport block size etc. of the control physical channel associated to the shared transport channel in the neighboring cell(s). The associated physical control channel in the neighboring cell then contains chunk allocation, modulation format, transport block size etc. for the shared transport channel in the neighboring cell. This information may be changed on a dynamic basis in the neighboring cell.

Alternatively, when using a configuration as shown in FIG. 12, the MIB in the source cell may comprise chunk allocation, modulation format, transport block size etc. for the shared transport channel in the neighboring cell(s). This information may for example be changed on semi-static basis in the neighboring cell.

In FIG. 10 to 18 illustrating various exemplary embodiments of the invention, the different SIBs have been distinguished by different numbers (SIB1, SIB2, SIB3, etc.). These numbers are merely intended to exemplarily indicate different information comprised by the respective SIB. However, in another embodiment of the invention the numbering of SIBs may indicate their respective content as indicated e.g. in Table 5.

Another embodiment of the invention relates to the implementation of the above described various embodiments using hardware and software. It is recognized that the various embodiments of the invention above may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for transmitting broadcast system information in a radio access network, the method comprising the steps of:
    mapping first system information including a master information block of a broadcast control logical channel to a broadcast transport channel,
    mapping second system information of a broadcast control logical channel to a shared transport channel,
    transmitting the first system information via the broadcast transport channel, and
    transmitting the second system information via the shared transport channel,
    wherein the shared transport channel is used for data transmission on dynamically allocated resources,
    the method further comprising a step of transmitting control information, on a control channel associated to the shared transport channel, that dynamically indicates at least one of parameters of scheduling, modulation, and transport block size of the second system information that is mapped on the shared transport channel that uses the dynamically allocated resources.

2. A method for transmitting broadcast system information in a radio access network of a mobile communication system, the method comprising the following steps performed by a transmission apparatus:
    mapping system information blocks of a broadcast control logical channel to a shared transport channel or a broadcast transport channel depending on a property of a respective system information block, and
    transmitting the system information blocks via the shared transport channel and the broadcast transport channel, respectively.

3. The method according to claim 2 wherein the property of a system information block is at least one of the temporal variability of the information contained in the system information block, the size of the system information block, the necessity of the information comprised in the system information block for system access, and the necessity of the information comprised in the system information block for tracking user location within the mobile communication system.

4. The method according to claim 2, wherein the property of the mobile terminals is at least one of the capability to support an optional feature within the mobile communication system.

5. The method according to claim 2, further comprising the step of transmitting a master information block of a broadcast control logical channel periodically via the broadcast transport channel, wherein the master information block comprises control information associated to a respective one of the system information blocks, wherein the associated control information indicates whether a respective system information block is mapped to the broadcast transport channel or the shared transport channel.

6. The method according to claim 5, wherein in case a system information block is mapped to the shared transport channel, the associated control information comprises transmission format and timing of a respective system information block transmitted via the shared transport channel.

7. The method according to claim 5, wherein in case a system information block is mapped to the broadcast transport channel, the associated control information specifies at least the position of the respective system information block on the broadcast transport channel, the time interval at which the respective system information block is transmitted and a timer value- or value tag-based update mechanism to be utilized to update the information of the respective system information block.

8. The method according to claim 2, further comprising the step of transmitting control information on a control channel associated to the shared data channel, wherein the control information indicates the transmission format and timing of a respective system information block transmitted via the shared transport channel.

9. The method according to the claim 8, wherein the control information further comprises identification of the logical channel to transport channel mapping.

10. The method according to claim 2, further comprising the step of transmitting control information via the shared transport channel, wherein the control information comprises an identification of the logical channel to transport channel mapping.

11. The method according to claim 9, wherein the identification of the logical channel to transport channel mapping is one of a plurality of configured or default identifiers.

12. The method according to claim 5, wherein the associated control information specifies at least the position of the respective system information block on the broadcast transport channel, the time interval at which the respective system information block is transmitted and a value- or value tag-based update mechanism to be utilized to update the information of the respective system information block.

13. The method according to claim 2, wherein the broadcast system information comprises information on the configuration of at least one shared transport channel of a neighboring radio cell.

14. A method for receiving broadcast system information in a radio access network, the method comprising the steps of:

receiving a first system information including a master information block of a broadcast control logical channel via a broadcast transport channel, obtaining timing information from the master information block, receiving control information, on a control channel associated to a shared transport channel, that dynamically indicates at least one of parameters of scheduling, modulation, and transport block size of the second system information that is mapped on the shared transport channel that uses dynamically allocated resources, and receiving a second system information block via the shared transport channel according to the timing information and at least one of the parameters of scheduling, modulation, and transport block size.

15. A method for receiving broadcast system information in a radio access network of a mobile communication system, the method comprising the following steps performed by a mobile terminal:

receiving a master information block of a broadcast control logical channel via a broadcast transport channel, wherein the master information block comprises control information associated to a respective one of a plurality of system information blocks used to convey the broadcast system information, wherein the associated control information indicates whether a respective system information block is mapped to the broadcast transport channel or a shared transport channel, and receiving system information blocks of a broadcast control logical channel on a shared transport channel and a broadcast transport channel according to the indication in the master information block.

16. The method according to claim 15, wherein in case a system information block is to be received via the shared transport channel, the associated control information in the master information block comprises a configuration of the shared transport channel to which the system information block is mapped, and the method further comprises the step of identifying the shared transport channel on which the system information block is mapped among a plurality of shared transport channels based on the indication in the associated control information of the master information block to receive the system information block via the identified shared channel.

17. The method according to claim 15, further comprising the step of receiving control information on a control channel associated to the shared data channel, wherein the control information indicates the transmission format and timing of a respective system information block transmitted via the shared transport channel, wherein the mobile terminal utilizes the indicated transmission format and timing for receiving the respective system information block on the shared transport channel.

18. The method according to claim 15, wherein the broadcast system information received by the mobile terminal comprises information on the configuration of at least one shared transport channel of a neighboring radio cell and the method further comprises the step of utilizing the information on the configuration of at least one shared transport channel of a neighboring radio cell for receiving broadcast system information in the neighboring radio cell, in case the mobile terminal is handed over to the neighboring radio cell.

19. A transmission apparatus in a radio access network for transmitting broadcast system information in the radio access network, the apparatus comprising:

a mapper for mapping first system information including a master information block of a broadcast control logical channel to a broadcast transport channel and for mapping second system information of a broadcast control logical channel to a shared transport channel, and a transmitter for transmitting the transmitting the first system information via the broadcast transport channel and for transmitting the second system information via the shared transport channel, wherein the shared transport channel is used for data transmission on dynamically allocated resources, the transmission apparatus further comprising a transmitter for transmitting control information, on a control channel associated to the shared transport channel, that dynamically indicates at least one of parameters of scheduling, modulation, and transport block size of the second system information that is mapped on the shared transport channel that uses the dynamically allocated resources.

20. A transmission apparatus in a radio access network for transmitting broadcast system information in the radio access network of a mobile communication system, the apparatus comprising:

a processor for mapping system information blocks of a broadcast control logical channel to a shared transport channel and a broadcast transport channel depending on a property of a respective system information block, and a transmitter for transmitting the system information blocks via the shared transport channel and the broadcast transport channel, respectively.

21. A receiving apparatus in a radio access network for receiving broadcast system information in the radio access network, the method comprising:

a receiver for receiving a first system information including a master information block of a broadcast control logical channel via a broadcast transport channel, and an obtaining means for obtaining timing information from the master information block, the receiver receiving control information, on a control channel associated to the shared transport channel, that dynamically indicates at least one of parameters of scheduling, modulation, and transport block size of the second system information that is mapped on the shared transport channel that uses dynamically allocated resources, wherein the receiver receives a second system information block via the shared transport channel according to the timing information and at least one of the parameters of scheduling, modulation, and transport block size.

22. A mobile terminal for receiving broadcast system information in a radio access network of a mobile communication system, the mobile terminal comprising:

a receiver for receiving a master information block of a broadcast control logical channel via a broadcast transport channel, a processor for obtaining control information from the master information block, the control information being associated to a respective one of a plurality of system information blocks used to convey the broadcast system information, wherein the associated control information indicates whether a respective system information block is mapped to the broadcast transport channel or a shared transport channel, and wherein the receiver is further adapted to receive system information blocks of a broadcast control logical channel on a shared transport channel and a broadcast transport channel according to the indication in the master information block.

23. A computer-readable medium storing instructions that, when executed by a processor of a transmission apparatus, causes the transmission apparatus to transmit broadcast system information in a radio access network of a mobile communication system, by:
mapping first system information including a master information block of a broadcast control logical channel to a broadcast transport channel,
mapping second system information of a broadcast control logical channel to a shared transport channel,
transmitting the first system information via the broadcast transport channel,
transmitting the second system information via the shared transport channel, wherein the shared transport channel is used for data transmission on dynamically allocated resources, and
transmitting control information, on a control channel associated to the shared transport channel, that dynamically indicates at least one of parameters of scheduling, modulation, and transport block size of the second system information that is mapped on the shared transport channel that uses the dynamically allocated resources.

24. A computer-readable medium storing instructions that, when executed by a processor of a transmission apparatus, causes the transmission apparatus to transmit broadcast system information in a radio access network of a mobile communication system, by:
mapping system information blocks of a broadcast control logical channel to a shared transport channel or a broadcast transport channel depending on a property of a respective system information block, and
transmitting the system information blocks via the shared transport channel and the broadcast transport channel, respectively.

25. A computer-readable medium storing instructions that, when executed by a processor of a receiving apparatus, causes the receiving apparatus to receive broadcast system information in a radio access network of a mobile communication system, by:
receiving a first system information including a master information block of a broadcast control logical channel via a broadcast channel,
obtaining timing information from the master information block,
receiving control information, on a control channel associated to the shared transport channel, that dynamically indicates at least one of parameters of scheduling modulation, and transport block size of the second system information that is mapped on the shared transport channel that uses dynamically allocated resources,
receiving a second system information block via the shared transport channel according to the timing information and at least one of the parameters of scheduling, modulation, and transport block size.

26. A computer-readable medium storing instructions that, when executed by a processor of a mobile terminal, causes the mobile terminal to receive broadcast system information in a radio access network of a mobile communication system, by:
receiving a master information block of a broadcast control logical channel via a broadcast transport channel, wherein the master information block comprises control information associated to a respective one of a plurality of system information blocks used to convey the broadcast system information, wherein the associated control information indicates whether a respective system information block is mapped to the broadcast transport channel or a shared transport channel, and
receiving system information blocks of a broadcast control logical channel on a shared transport channel or a broadcast transport channel according to the indication in the master information block.

27. A method for transmitting broadcast system information in a radio access network of a mobile communication system, the method comprising the following steps performed by a transmission apparatus:
mapping system information blocks of a broadcast control logical channel to a shared transport channel or a broadcast transport channel depending on a property of the mobile terminals to receive the broadcast system information, and
transmitting the system information blocks via the shared transport channel and the broadcast transport channel, respectively.

28. A transmission apparatus in a radio access network for transmitting broadcast system information in the radio access network of a mobile communication system, the apparatus comprising:
a processor for mapping system information blocks of a broadcast control logical channel to a shared transport channel and a broadcast transport channel depending on a property of the mobile terminals to receive the broadcast system information, and
a transmitter for transmitting the system information blocks via the shared transport channel and the broadcast transport channel, respectively.

29. A computer-readable medium storing instructions that, when executed by a processor of a transmission apparatus, causes the transmission apparatus to transmit broadcast system information in a radio access network of a mobile communication system, by:
mapping system information blocks of a broadcast control logical channel to a shared transport channel or a broadcast transport channel depending on a property of the mobile terminals to receive the broadcast system information, and
transmitting the system information blocks via the shared transport channel and the broadcast transport channel, respectively.

* * * * *